United States Patent [19]

Kaya et al.

[11] Patent Number: 6,004,638

[45] Date of Patent: Dec. 21, 1999

[54] BOTTLE FROM POLYESTER COMPOSITION AND PROCESS FOR PRODUCING THE SAME

[75] Inventors: Hidenori Kaya; Isao Hata; Koji Nakamachi; Michio Tugawa; Susumu Hatabu, all of Kuga-gun, Japan

[73] Assignee: Mitsui Chemicals, Inc., Tokyo, Japan

[21] Appl. No.: 08/608,494

[22] Filed: Feb. 28, 1996

[30] Foreign Application Priority Data

Mar. 9, 1995 [JP] Japan .................................. 7-050117
Oct. 2, 1995 [JP] Japan .................................. 7-254976

[51] Int. Cl.$^6$ ........................................................ H01B 3/00
[52] U.S. Cl. ........................ 428/35.7; 428/36.6; 428/36.8
[58] Field of Search ................................ 428/35.7, 36.6, 428/36.8

[56] References Cited

U.S. PATENT DOCUMENTS 4,661,546  4/1987  Abu-Isa et al. ........................ 524/153

FOREIGN PATENT DOCUMENTS 2-294357  12/1990  Japan .

*Primary Examiner*—Charles Nold
*Attorney, Agent, or Firm*—Birch, Stewart, Kolasch & Birch, LLP

[57] ABSTRACT

A bottle molded from a polyester composition comprising 97 to 99.99% by weight of a polyester and 3 to 0.01% by weight of a polyester elastomer, which bottle exhibits dimensional change ratios of not greater than 5% measured in the height direction of the bottle and also not greater than 5% measured in the wall part diameter direction of the bottle and has an overturning angle of at least 10°, when the bottle was subjected to a hot bath test in which the bottle is filled with a beverage containing 2.5 gas volume carbon dioxide at 23° C., stoppered and immersed in sealed condition in a hot bath heated at 70° C. Thus, the bottle retains self-standing property without deformation even after it is filled with a carbonated beverage and subjected to heat sterilization.

4 Claims, 3 Drawing Sheets

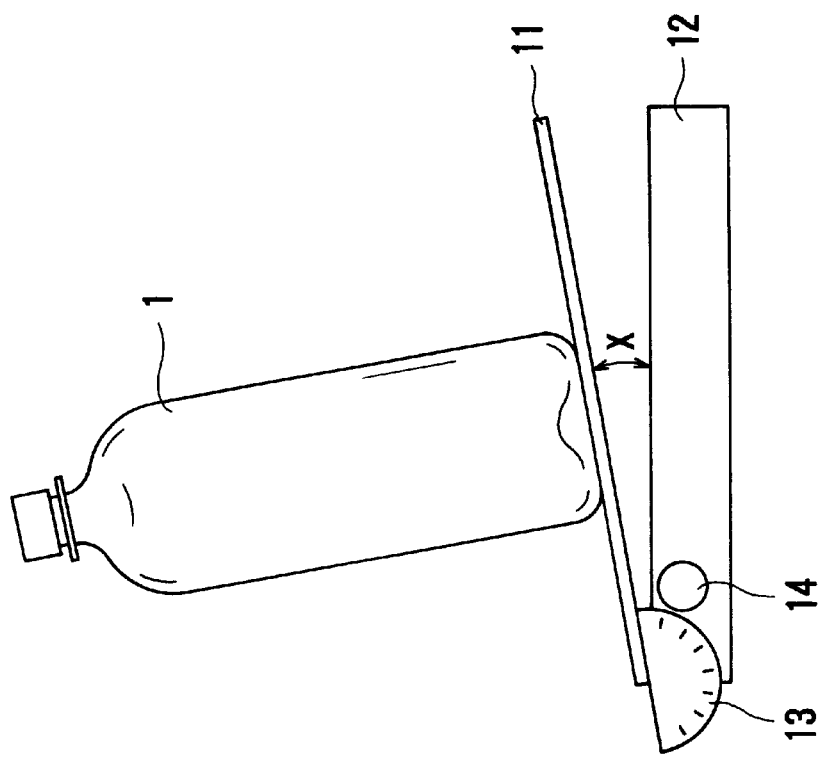
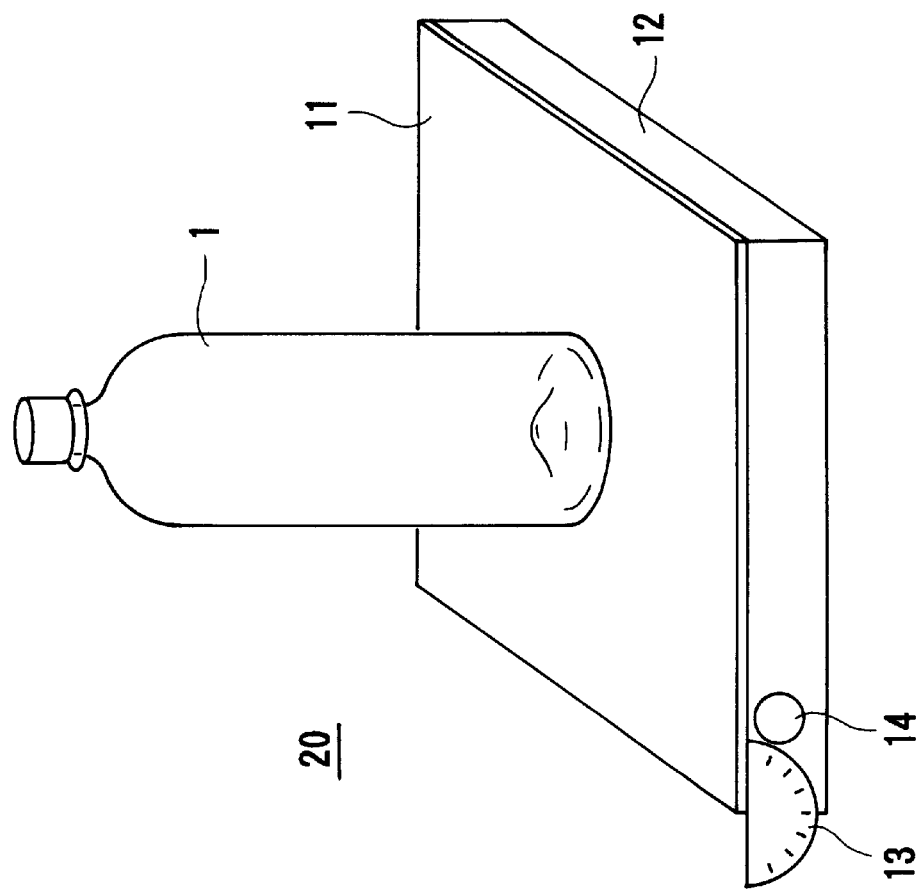

BOTTLE FROM POLYESTER COMPOSITION AND PROCESS FOR PRODUCING THE SAME

FIELD OF THE INVENTION

The present invention relates to a bottle molded from a polyester composition and a process for producing the same. More particularly, this invention is concerned with a bottle molded from a polyester composition which can retain self-standing property without deformation even after it is filled with a carbonated beverage and subjected to heat sterilization and a process for producing the same.

BACKGROUND OF THE INVENTION

Various plastic materials have been used as raw materials of bottles for drinks such as juice, natural water and tea drinks of various kinds in recent years. Among them, polyesters such as polyethylene terephthalate have widely been employed because of their excellence in transparency, gas barrier property, heat resistance and mechanical strength.

For example, the above tea drinks are sterilized by heating in advance and the hot tea drinks are charged in bottles. Therefore, the plastics for use in molding the bottles must have excellent heat resistance. Otherwise, the bottles may have the problems of deformation, shrinkage, swelling, etc.

On the other hand, carbonated beverages are first charged in bottles and then sterilized by heating. Thus, the bottles must retain excellent heat resistance even when the internal pressures thereof are high. Otherwise, the bottles may have the problems of deformation, shrinkage, swelling, etc. Therefore, there are demands for plastic bottles having properties ensuring capability of retaining self-standing property without deformation even after they are filled with a carbonated beverage, stoppered and subjected to heat sterilization (hereinafter occasionally referred to as "pressure resistant properties at high temperature").

Base-cup-equipped bottles having a base cup provided at a round bottom part thereof have been employed in such uses. However, the above base-cup-equipped bottles encounter the problems that the production cost is high and that the recycling is difficult because the bottle body is composed of a polyester while the base cup is composed of a different material such as polyethylene with the result that the attempt to melt the whole bottle and remold the melt into bottles and the like would lead to production of only items which are inferior in transparency and other properties.

In the above circumstances, the inventors have made extensive and intensive investigations with a view toward obtaining a self-standing bottle which hardly deforms at, for example, its neck/mouth part and bottom part when heat sterilization is applied to the contents filled therein and which is composed of the same material in its whole structure to enable recycling. As a result, it has been found that a bottle which is composed of a specified polyester composition and which meets given criteria at a given hot bath test can attain the above object. The present invention has been completed on the basis of the above finding.

OBJECT OF THE INVENTION

The object of the present invention is to provide a bottle molded from a polyester composition which is capable of retaining self-standing property without deformation even after it is filled with a carbonated beverage, stoppered and subjected to heat sterilization and a process for producing the same, in particular in shortened molding cycles.

SUMMARY OF THE INVENTION

The bottle molded from a polyester composition according to the present invention comprises 97 to 99.99% by weight of a polyester and 3 to 0.01% by weight of a polyester elastomer, which bottle has a height direction and a wall part diameter direction and meets the following criteria after a hot bath test in which the bottle is filled with a beverage containing 2.5 gas volume carbon dioxide at 23° C., stoppered and immersed in sealed condition in a hot bath heated at 70° C. for 1 hr:

Criterion 1
 the bottle filled with the carbonated beverage exhibits dimensional change ratios of not greater than 5% measured in the height direction of the bottle and also not greater than 5% measured in the wall part diameter direction of the bottle, and Criterion 2
 the bottle has an overturning angle of at least 10°.

It is preferred that the polyester composition bottle have a crystallinity ranging from 15 to 60% at each of neck, wall center and base center parts of the bottle.

Also, it is preferred that, provided that R represents a distance between base part center and base part perimeter of the bottle, (i) the bottle have a crystallinity of 15 to 60% in a zone extending from the base part center to a distance of 7/10 R from the base part center, (ii) the bottle have a heat crystallinity of 1 to 25%, an orientation crystallinity of 10 to 35% and a sum of heat crystallinity and orientation crystallinity ranging from 15 to 60% in a zone extending from a distance of 7/10 R from the base part center to a distance of 9/10 R from the base part center, and (iii) the bottle have a crystallinity of 15 to 60% in a zone extending from a distance of 9/10 R from the base part center to the base part perimeter (10/10 R from the base part center).

Still further, it is preferred that the polyester composition exhibit a half time of crystallizing "t ½" of not greater than 150 s as measured with the use of a differential scanning calorimeter according to isothermal crystallization method (140° C.) and that the bottle exhibit a haze value of not greater than 5% at a wall part center of the bottle.

The polyester composition bottle of the present invention may be a self-standing bottle having a foot part at a base part of the bottle.

The polyester composition bottle of the present invention is excellent in pressure resistant properties at high temperature. Further, the whole bottle structure is composed of a single material, so that it can directly be melted and remolded into bottles or the like for recycling.

The process for producing a bottle from a polyester composition according to the present invention comprises molding a polyester composition comprising 97 to 99.99% by weight of a polyester and 3 to 0.01% by weight of a polyester elastomer into a preform, and
 subjecting the preform to a stretching blow molding,
 thereby obtaining a bottle having a crystallinity ranging from 15 to 60% at a base part thereof.

In the process of the present invention, it is preferred that the preform have its neck part heated to crystallize to a crystallinity of 15 to 60% before the stretching blow molding, that the stretching blow molding of the preform be conducted at an area stretching ratio of 6 to 15 and that heat setting be performed after the stretching blow molding so that the crystallinity of the bottle is 15 to 60% at its base part.

The present invention provides a suitable process for producing a self-standing bottle having a foot part at the base part of the bottle.

A polyester composition bottle having excellent heat pressure resisting properties can be produced by the process of the present invention.

BRIEF DESCRIPTION OF THE DRAWING

FIG. 3 is a schematic explanatory view of an apparatus for measuring a bottle overturning angle.

DETAILED DESCRIPTION OF THE INVENTION

Figure 1:
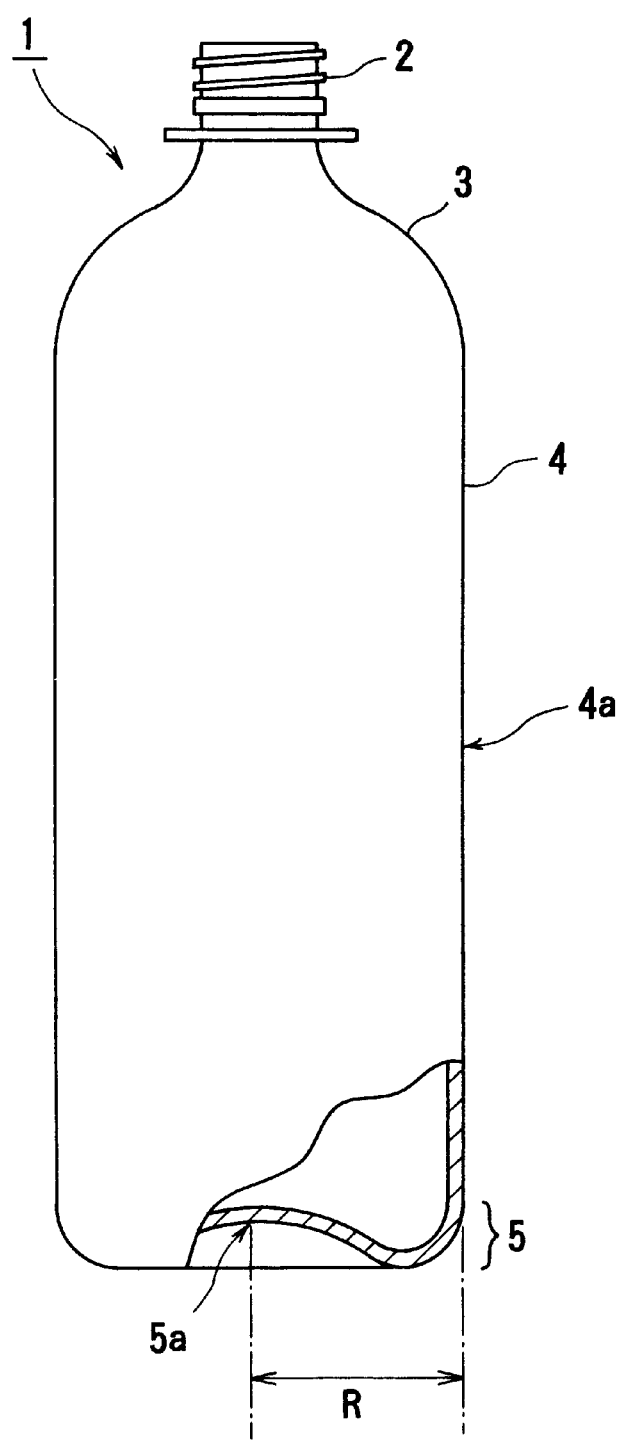
FIG. 1 is a partially cutaway schematic front view of one form of polyester composition bottle according to the present invention.

The polyester composition bottle and the process for producing the same according to the present invention will be described below.

The polyester composition bottle of the present invention is composed of the below specified polyester composition and meets the following criteria 1 and 2 after a hot bath test in which the bottle is filled with a beverage containing 2.5 gas volume carbon dioxide at 23° C., stoppered and immersed in sealed condition in a hot bath heated at 70° C. for 1 hr. The term "gas volume" used herein means a volume occupied by a certain gas at a temperature of 23° C. and a pressure of 1 atm. The wording "beverage containing 2.5 gas volume carbon dioxide" means that a beverage contains 2.5 volume (gas volume) of carbon dioxide per 1 volume of the beverage.

Criterion 1 the bottle filled with the carbonated beverage exhibits dimensional change ratios of not greater than 5%, preferably, not greater than 3% measured in the height direction of the bottle and also not greater than 5%, preferably, not greater than 3% measured in the wall part diameter direction of the bottle.

Criterion 2 the bottle has an overturning angle of at least 10°. The method of measuring the overturning angle of the bottle will be described later.

The dimensional change ratio of the bottle not only in the direction of the height but also in the direction of the wall part diameter thereof is calculated by the formula:

$$\text{Dimensional change ratio } (\%) = \frac{D_1 - D_2}{D_1} \times 100$$

$$\text{Dimensional change ratio } (\%) = \frac{D_1 - D_2}{D_1} \times 100$$

wherein $D_1$ is a dimension of the bottle filled with the above-carbonated beverage before immersion and $D_2$ is a dimension of the bottle filled with the beverage after immersion at 23° C.

With respect to the crystallinity of the polyester composition bottle of the present invention, it is desired that this crystallinity range from 15 to 60% and, especially, 15 to 50% at each of the neck part, the wall part center and the base part center. The crystallinity of each part of the bottle is determined according to the below described X-ray diffractometry.

In the present invention, it is preferred that, provided that R represents a distance between base part center and base part perimeter of the polyester composition bottle (See FIG. 1), (i) the bottle have a crystallinity of 15 to 60% and, especially, 15 to 50% in a zone extending from the base part center to a distance of 7/10 R from the base part center, (ii) the bottle have a heat crystallinity of 1 to 25% and, especially, 10 to 20%, an orientation crystallinity of 10 to 35% and, especially, 10 to 20% and a sum of heat crystallinity and orientation crystallinity ranging from 15 to 60% and, especially, 15 to 50% in a zone extending from a distance of 7/10 R from the base part center to a distance of 9/10 R from the base part center, and (iii) the bottle have a crystallinity of 15 to 60% and, especially, 15 to 50% in a zone extending from a distance of 9/10 R from the base part center to the base part perimeter (10/10 R from the base part center).

In the present invention, it is desired that the crystallinity be in the range of 15 to 60% at both the neck part and the wall part center and that the above conditions (i) to (iii) be met at the base part of the bottle.

The polyester composition bottle of the present invention is preferred to have a haze value of not greater than 5% and, especially, not greater than 3% at the wall part center thereof.

The polyester composition bottle of the present invention is composed of a composition comprising a polyester and a polyester elastomer.

The above polyester and polyester elastomer will now be described in detail.

Examples of the polyesters suitable for use in the polyester composition bottle of the present invention include polyethylene terephthalate, polyethylene naphthaiate and a mixture (composition) thereof.

Polyethylene Terephthalate

The polyethylene terephthalate is produced from terephthalic acid and ethylene glycol as raw materials. This polyethylene terephthalate may be a copolymer containing up to 20 mol % of other dicarboxylic acid and/or other dihydroxy compound units.

Examples of the dicarboxylic acids other than terephthalic acid for use in the copolymerization include:

aromatic dicarboxylic acids such as phthalic, isophthalic, naphthalenedicarboxylic, diphenyldicarboxylic and diphenoxyethanedicarboxylic acids;

aliphatic dicarboxylic acids such as adipic, sebacic, azelaic and decanedicarboxylic acids; and alicyclic dicarboxylic acids such as cyclohexanedicarboxylic acid.

Examples of the dihydroxy compounds other than ethylene glycol for use in the copolymerization include:

aliphatic glycols such as trimethylene, 1,2-propylene, tetramethylene, neopentyl, hexamethylene and dodecamethylene glycols;

alicyclic glycols such as cyclohexanedimethanol;

bisphenols; and aromatic diols such as hydroquinone and 2,2-bis(4-β-hydroxyethoxyphenyl)propane.

The above polyethylene terephthalate is a substantially linear polyester in which ester bonds are formed by ethylene terephthalate component units alone or a random arrangement of ethylene terephthalate component units and dioxyethylene terephthalate component units. The substantial linearity of the polyethylene terephthalate is confirmed by dissolution thereof in o-chlorophenol.

The above polyethylene terephthalate is preferred to have an intrinsic viscosity ($\eta$) (measured at 25° C. in o-chlorophenol) ranging generally from 0.6 to 1.5 dl/g and, especially, from 0.7 to 1.2 dl/g, a melting point ranging generally from 210 to 265° C. and, especially, from 220 to 260° C. and a glass transition temperature ranging generally from 50 to 120° C. and, especially, from 60 to 100° C.

Polyethylene Naphthalate

The polyethylene naphthalate is preferred to contain ethylene 2,6-naphthalate units derived from 2,6-naphthalenedicarboxylic acid and ethylene glycol in an amount of at least 60 mol %, especially, at least 80 mol % and, still especially, at least 90 mol %. However, the polyethylene naphthalate may contain constituent units other than ethylene 2,6-naphthalate units in an amount of less than 40 mol %.

Examples of the constituent units other than ethylene 2,6-naphthalate units include those derived from an acid selected from among:

aromatic dicarboxylic acids such as terephthalic, isophthalic, 2,7-naphthalenedicarboxylic, 2,5-naphthalenedicarboxylic, diphenyl-4,4'-dicarboxylic, 4,4'-diphenyl ether dicarboxylic, 4,4'-diphenyl sulfone dicarboxylic, 4,4'-diphenoxyethanedicarboxylic and dibromoterephthalic acids;

aliphatic dicarboxylic acids such as adipic, azelaic, sebacic and decanedicarboxylic acids;

alicyclic dicarboxylic acids such as 1,4-cyclohexanedicarboxylic, cyclopropanedicarboxylic and hexahydroterephthalic acids; and hydroxycarboxylic acids such as glycolic, p-hydroxybenzoic and p-hydroxyethoxybenzoic acids, and a hydroxy compound selected from among:

propylene glycol, trimethylene glycol, diethylene glycol, tetramethylene glycol, pentamethylene glycol, hexamethylene glycol, decamethylene glycol, neopentylene glycol, p-xylene glycol, 1,4-cyclohexanedimethanol, bisphenol A, p,p-diphenoxy sulfone, 1,4-bis($\beta$-hydroxyethoxy)benzene, 2,2-bis(p-$\beta$-hydroxyethoxyphenol)propane, polyalkylene glycols, p-phenylenebis(dimethylsiloxane) and glycerol.

The polyethylene naphthalate for use in the present invention may contain constituent units derived from polyfunctional compounds such as trimesic acid, trimethylolethane, trimethylolpropane, trimethylolmethane and pentaerythritol in a small amount of, for example, not greater than 2 mol %.

Further, the polyethylene naphthalate for use in the present invention may contain constituent units derived from monofunctional compounds such as benzoylbenzoic acid, diphenyl sulfone rnonocarboxylic acid, stearic acid, methoxypolyethylene glycol and phenoxypolyethylene glycol in a small amount of, for example, not greater than 2 mol %.

The above polyethylene naphthalate is substantially linear. This is confirmed by dissolution thereof in o-chlorophenol.

The polyethylene naphthalate is preferred to have an intrinsic viscosity ($\eta$) ranging generally from 0.2 to 1.1 dl/g, especially, from 0.3 to 0.9 dl/g and, still especially, from 0.4 to 0.8 dl/g as measured at 25° C. in o-chlorophenol.

The intrinsic viscosity ($\eta$) of the polyethylene naphthalate is measured by the following procedure. Illustratively, the polyethylene naphthalate is dissolved in o-chlorophenol in a concentration of 1 g/100 ml. The viscosity of the solution is measured at 25° C. by the use of Ubbelohde capillary viscometer. Then, o-chlorophenol is gradually added and the solution viscosities at low concentrations are measured, thereby effecting an extrapolation to a concentration of 0%. Thus, the intrinsic viscosity ($\eta$) is determined.

The heat-up crystallizing temperature (Tc) of the polyethylene naphthalate is preferred to be generally at least 150° C., especially, in the range of 160 to 230° C. and, still especially, in the range of 170 to 220° C. as measured by heating a sample at a rate of 10° C./min by means of a differential scanning calorimeter (DSC).

The heat-up crystallizing temperature (Tc) of the polyethylene naphthalate is measured by the following method. About 10 mg of a sample flake is cut from the center of a polyethylene naphthalate chip dried at about 140° C. under a pressure of about 5 mmHg for 5 hr. The sample flake is sealed into an aluminum pan for fluid in a nitrogen atmosphere and measured by the use of a scanning calorimeter of model DSC-2 manufactured by Perkin-Elmer Co. under the conditions such that the sample is first heated rapidly from room temperature to 290° C., at which the sample is kept for 10 min at a molten state, and then cooled rapidly to room temperature, and thereafter heated again at a rate of 10° C./min. The summit temperature of the exothermic peak detected during the temperature rise at a rate of 10° C./min is measured.

Polyester Elastomer

The polyester elastomer is a thermoplastic elastomer having crystalline hard segments of high melting point and soft segments. In the present invention, it is preferred to employ a polyester-polyether block copolymer having hard segments composed of an aromatic polyester and soft segments composed of a polyether or a polyester-polyester block copolymer having hard segments composed of an aromatic polyester and soft segments composed of an aliphatic polyester.

The above polyester-polyether block copolymer can be obtained by polycondensation of an aromatic polyester and a polyether according to the customary procedure. The above polyester-polyester block copolymer can be obtained by polycondensation of an aromatic polyester and an aliphatic polyester according to the customary procedure.

Each of the aromatic polyester segments as constituent units of the polyester-polyether block copolymer and polyester-polyester block copolymer is composed of a constituent unit derived from an aromatic dicarboxylic acid and a constituent unit derived from a dihydroxy compound.

Examples of the aromatic dicarboxylic acids include terephthalic, isophthalic, naphthalenedicarboxylic and diphenyldicarboxylic acids. These may be used in combination.

Examples of the dihydroxy compounds include aliphatic dihydroxy compounds such as ethylene glycol, trimethylene glycol, 1,2-propylene glycol, tetramethylene glycol, pentamethylene ghycol, neopentyl glycol, 2,2-dimethyltrimethylene glycol, hexamethylene glycol and dodecamethylene glycol; aromatic dihydroxy compounds such as p-xylene glycol; and alicyclic dihydroxy compounds such as cyclohexanedirnethanol. These may be used in combination.

The aromatic polyester segment may be either a homopolyester from terephthalic acid and one type of alkylene glycol or a copolyester from at least two types of dicarboxylic acid components and one type of dihydroxy component, from one type of dicarboxylic component and at least two types of dhydroxy components or from at least two types of dicarboxylic acid components and at least two types of dihydroxy components.

The above polyethylene terephthalate, polyethylene naphthalate and polyester elastomer can be produced by the conventional processes.

The polyester composition bottle of the present invention is molded from a polyester composition comprising the above polyester and polyester elastomer.

This polyester composition is preferred to comprise 97 to 99.99% by weight of a polyester and 3 to 0.01% by weight of a polyester elastomer, especially, 99.0 to 99.95% by weight of a polyester and 1.0 to 0.05% by weight of a polyester elastomer, and still especially, 99.0 to 99.5% by weight of polyester and 1.0 to 0.5% by weight of polyester elastomer.

The polyester composition can be prepared by any of the conventional methods, e.g., the method in which the polyester is mixed with the polyester elastomer by means of a mixer such as a tumbling blender or a Henschel mixer and melt kneaded by means of an extruder or a kneader.

The above polyester composition may contain in an amount not detrimental to the object of the present invention any of various additives such as crosslinking agents, heat stabilizers, weathering stabilizers, antistatic agents, lubricants, mold releasing agents, inorganic fillers, pigments, pigment dispersants and dyes.

The above polyester composition exhibits a half time of crystallizing "t ½" of generally not greater than 150 s and, preferably, not greater than 130 s as measured with the use of a differential scanning calorimeter according to an isothermal crystallization method (140° C.). With respect to the conventional polyesters, for example, polyethylene terephthalate and polyethylene naphthalate exhibit a half time of crystallizing "t ½" of about 200 to 300 s and about 500 to 1000 s, respectively. The method of measuring the half time of crystallizaing "t ½" will be described later.

Figure 2A:
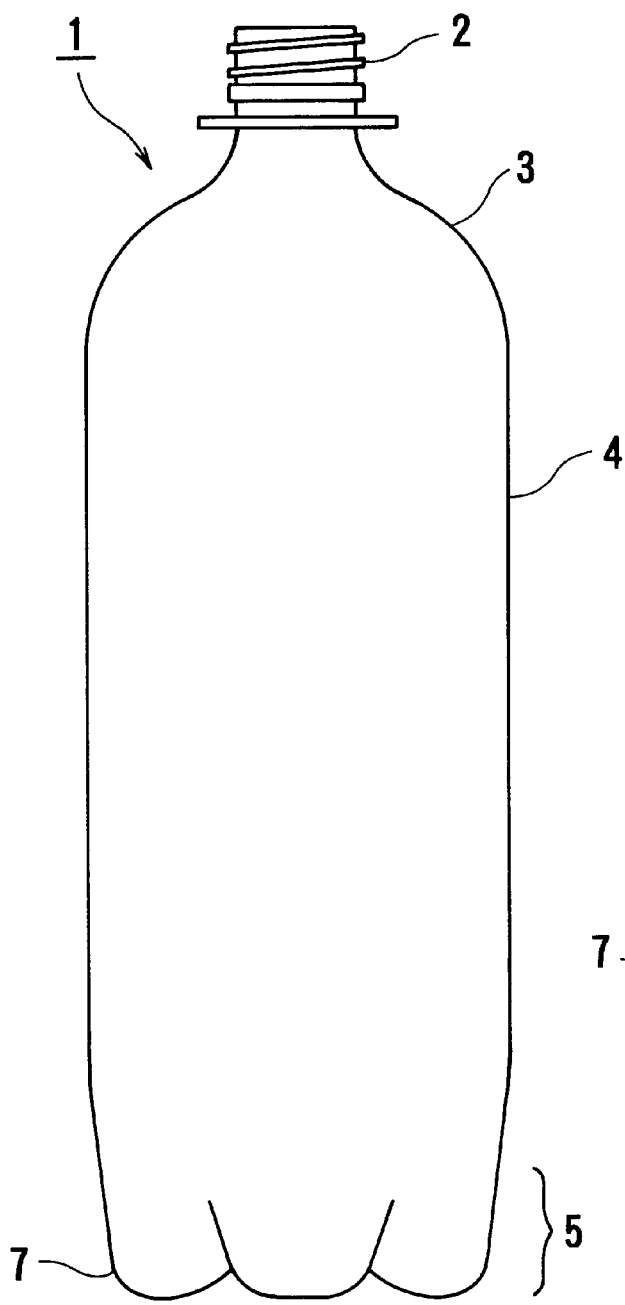
FIG. 2(A) is a schematic front view of another form of polyester composition bottle (bottle of a five feet type) according to the present invention and FIG. 2(B) is a schematic bottom plan view of the same.
Figure 2B:
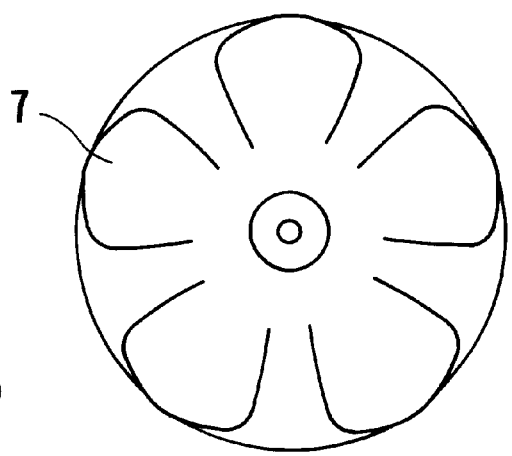

The polyester composition bottle may be a self-standing bottle having a foot part at its base part, for example, bottle of a five feet type. FIG. 2 shows one form of the bottle of the five feet type. FIG. 2 (A) is a schematic front view showing the bottle of the five feet type and FIG. 2 (B) is a schematic bottom plan view of the same. In the figures, numerals 2, 3, 4, 5 and 7 denote a neck part, an upper shoulder part, a wall part, a base part and a foot part, respectively. The center of the wall part 4 (wall part center) is indicated by 4a and the center of the base part 5 (base part center) is indicated by 5a.

The polyester composition bottle of the present invention may be used as a container for noncarbonated drinks such as natural water and tea drink and also as a container for carbonated beverages such as cider and cola. Especially, the polyester composition bottle is suitably used as a container for carbonated beverages.

The polyester composition bottle of the present invention is capable of retaining self-standing property with little deformation even after it is filled with a carbonated beverage, stoppered and subjected to heat sterilization. Further, the polyester composition bottle of the present invention is excellent in transparency. Still further, the whole structure of the bottle is composed of a single resin, so that it can directly be melted and remolded into bottles or the like for recycling.

The process for producing the above polyester composition bottle according to the present invention will be illustrated below.

The polyester composition bottle 1 of the present invention, for example, has a neck part 2, an upper shoulder part 3, a wall part 4 and a base part 5 as shown in FIG. 1.

In the production of this bottle, first, a preform is prepared from the above polyester composition. The preform can be prepared by any of conventional techniques such as injection and extrusion moldings. In the preparation of the preform, it is preferred that the polyester composition be generally heated at 90 to 110° C.

In the present invention, stretching blow molding (also referred to as "draw blow molding") of this preform is conducted in a mold to obtain the above polyester composition bottle having a crystallinity of 15 to 60% and, preferably, 15 to 50% at the base part of the bottle.

In the draw blow molding, the area draw ratio is preferred to range from 6 to 15 and, especially, from 7 to 12. The terminology "area stretching ratio" (hereinafter occasionally referred to simply as "draw ratio") used herein means a stretching ratio defined as the product of longitudinal stretching ratio and lateral stretching ratio.

In the draw blow molding, the temperature of the blowing fluid is preferred to range from 10 to 400° C. and, especially, from 20 to 300° C. Examples of the blowing fluids include air, nitrogen, steam and water. Of these, the use of air is preferred.

The above draw blow molding of the preform at a high area draw ratio of at least 11 into the bottle is preferred because the bottle being excellent in, particularly, heat pressure resisting properties can be obtained. In conventional bottle drawing methods, the preform is generally drawn into the bottle at an area draw ratio of about 6 to 10.

In the present invention, it is preferred that, prior to the draw blow molding, the neck part of the preform be heated to crystallize to a crystallinity of 15 to 60% and, especially, 15 to 50% exhibited at the neck part. The heating crystallization of the neck part of the preform is generally conducted by heating the neck part at 150 to 200° C. and, preferably, 170 to 190° C.

In the present invention, after the above draw blow molding, the resultant draw-blow-molded bottle is preferably heat set. This heat setting of the draw-blow-molded bottle can increase the density of the wall part of the bottle. In the heat setting of the base part of the bottle, it is preferred that the sum of the crystallinity attributed to heating crystallization of the base part of the preform (heat crystallinity) and the crystallinity attributed to draw blow molding of the base part of the bottle (orientation crystallinit.) range from 15 to 60% and, especially, from 15 to 50%.

The heat setting is conducted by holding the obtained bottle in a mold heated at 100 to 200° C., preferably, 110 to 170° C. for at least 1 s, preferably, at least 3 s.

This heat setting enables not only obtaining a bottle having increased density and thus increased strength at its wall part but also obtaining a bottle having high crystallinity at its base part and excellent pressure resistant properties at high temperature.

For example, the draw-blow-molded bottle of the polyester composition has a wall part density of about 1.355 to 1.370 g/cm$^3$ before the heat setting but has a wall part density increased to about 1.370 to 1.410 g/cm$^3$, preferably, about 1.375 to 1.390 g/cm$^3$ after the heat setting though depending on the heat setting temperature.

In the present invention, the above draw-blow-molded bottle having optionally undergone the heat setting is preferably cooled before withdrawal. This cooling is preferably conducted by an internal cooling method in which, for example, a cooled gas is introduced inside the bottle to cool it from its inside toward its outside (outer surface). This, cooling of the bottle from the inside (hollow part of the bottle) enables withdrawing the bottle from the mold without suffering from bottle deformation, shrinkage and other failure.

Inside the bottle, the cooling temperature is preferred to range generally from −100 to +50° C. and, especially, from −75 to +40° C. The bottle cooling rate is preferred to range generally from 300 to 10° C./min though depending on the thickness of the bottle and the type of material employed therein. During the above cooling of the bottle, it is preferred that the temperature of the outer surface of the bottle be not greater than 100° C. For example, air or nitrogen may be used as the cooling gas, and air is preferred.

According to the process of the present invention as described above, a polyester composition bottle having the following properties can be produced:

after the above-mentioned hot bath test, the bottle filled with the carbonated beverage exhibits dimensional change ratios of not greater than 5% measured in the height direction of the bottle and also not greater than 5% measured in the wall part diameter direction of the bottle, and the empty bottle has an overturning angle of at least 10°;

the bottle has a crystallinity ranging from 15 to 60% at each of neck, wall center and base center parts of the bottle; and (i) the bottle has a crystallinity of 15 to 60% in a zone extending from the base part center to a distance of 7/10 R from the base part center, (ii) the bottle has a heat crystallinity of 1 to 25%, an orientation crystallinity of 10 to 35%; and a sum of heat crystallinity and orientation crystallinity ranging from 15 to 60% in a zone extending from a distance of 7/10 R from the base part center to a distance of 9/10 R from the base part center, and (iii) the bottle has a crystallinity of 15 to 60% in a zone extending from a distance of 9/10 R from the base part center to the base part perimeter (10/10 R from the base part center).

In the process for producing the polyester composition bottle according to the present invention, an oriented bottle having improved pressure resistant properties at high temperature can be molded from the specified polyester composition by the specified method. Thus, the bottle deformation can be minimized during the heat sterilization subsequent to the filling of carbonated beverage, and thus the bottle can retain the self-standing property thereof.

Moreover, because the polyester composition used in the present invention has a short half time of crystallizing "t ½", the bottle molding cycle can be shortened.

EFFECT OF THE INVENTION

The polyester composition bottle of the present invention not only has excellent heat pressure resisting properties and transparency but also can easily be recycled.

The process for producing the polyester composition bottle according to the present invention enables not only production of the bottle having excellent pressure resistant properties at high temperature and transparency but also shortening the bottle molding cycle.

The present invention will further be illustrated with reference to the following Examples, which in no way limit the scope of the invention.

EXAMPLE

Time of Crystallizing

The half time of crystallizing "t ½" was measured by he use of a differential scanning calorimeter (DSC) manufactured by Perkin-Elmer Co.

10 mg of a sample was weighed out and put in a sample pan. The sample was heated from room temperature to 290° C. at a rate of 320° C./min, held at 290° C. for 10 min, rapidly cooled to 30° C., heated again to 140° C. at a rate of 320° C./min and held at 140° C. The sample crystallized at this temperature to give a time-exothermic curve, from which a total calorific value was obtained. The half time of crystallizing "t ½" was defined as the time (second) taken to generate heat in an amount of ½ of the total calorific value.

Evaluation of Pressure Resistant Properties at High Temperature of Bottle

The pressure resistant properties at high temperature of the bottle were evaluated by filling the bottle with contents containing 2.5 gas volume (GV) of carbon dioxide, immersing the bottle in 70° C. bath for 1 hr and taking the bottle out of the bath. This bottle was compared with that prior to the immersion in the bath in respect of deformation and self-standing property. When the deformation of the bottle was little and the bottle retained its self-standing property, the bottle was evaluated as being excellent in pressure resistant properties at high temperature.

Overturning Angle

The overturning angle of the bottle was determined for the bottle filled with the carbonated beverage immediately after immersion in the hot bath as described above with the use of a measuring apparatus as shown in FIG. 3 by the following method.

Referring to FIG. 3 (A), the bottle 1 to be measured was placed on an upper plate 11 of the overturning angle measuring apparatus 20. Referring to FIG. 3 (B), the upper plate 11 was slowly inclined on by turning a handle 14 secured to a lower stationary plate 12. The angle X made between the lower stationary plate 12 and the upper plate 11 just when the bottle 1 on the upper plate 11 overturned was measured by an angle measuring device 13 (protractor) secured to one edge of the upper plate 11 to determine the overturning angle of the bottle.

Measurement of Crystallinity

The value of crystallinity appearing herein is an average of the crystallinity values obtained by measuring three specimens prepared in the following manner.

Specimen

Square pieces of 10×10 mm were cut out from the bottle, and piled one upon another to obtain a measuring specimen of 1 mm in thickness.

Apparatus

X-ray diffractometer: RU-300 manufactured by Rigaku Denki Co., Ltd.,

X-ray source: CuKα point focus,

Output: 60 kV, 300 mA,

Attached equipment: wide-angle goniometer, rotary sample stage,

Optical system: transmission method (2θ scan), collimator 1 mmφ,

Detector: scintillation counter.

Measurement of crystallinity (1) The diffraction intensity of each specimen was measured with the 2θ (the angle between the diffracted beam and the transmitted beam) ranging from 5 to 35°.

(2) The background diffraction intensity was subtracted from the diffraction intensity measured in item (1)

above. The diffraction intensity obtained by the subtraction was represented by Ic.

(3) The already measured diffraction intensity at 100% amorphism of the identical resin was represented by Ia.

(4) The crystallinity (Xcr) of the specimen was calculated by the following formula:

$$Xcr\ (\%) = \frac{Ic}{Ic + Ia} \times 100.$$

EXAMPLE 1

99.8 parts by weight of polyethylene terephthalate (J135 produced by Mitsui PET Resin, Ltd., hereinafter referred to as "PET-1") and 0.2 part by weight of polybutylene terephthalate elastomer (hereinafter referred to as "PBT elastomer") were blended together by means of a tumbler blender and molded by means of an injection molding machine M-100A manufactured by Meiki Seisakusho into a bottle preform. The molding was conducted at 290° C.

The neck part of the preform was heated at 200° C. to crystallize the same. Subsequently, the preform was heated by means of an infrared heater attached to a molding machine LB-01 manufactured by CORPOPLAST until the surface temperature became 90 to 100° C. at the center of the wall part of the preform and draw blow molding of the preform was conducted by means of the molding machine LB-01. Thus, the bottle as shown in FIG. 1 was obtained. At the drawing, the blowing mold was heated at 150° C., and the bottle was brought into contact with the mold for 5 s to thereby perform heat setting. Thereafter, the bottle was cooled to 100° C. or below and withdrawn from the mold. The draw ratio of the preform for obtaining the bottle was 2 in longitudinal direction and 3.5 in lateral direction.

With respect to the thus obtained bottle, the pressure resistant properties at high temperature defined herein were evaluated. The results are given in Tables 1 and 2.

EXAMPLE 2

Another bottle was produced in the same manner as in Example 1 except that polyethylene terephthalate (J125 produced by Mitsui PET Resin, Ltd., hereinafter referred to as "PET-2") was substituted for the PET-1.

With respect to the thus obtained bottle, the pressure resistant properties at high temperature defined herein were evaluated in the same manner as in Example 1. The results are given in Tables 1 and 2.

EXAMPLE 3

Still another bottle was produced in the same manner as in Example 1 except that use was made of a composition consisting of 99.95 wt. % of PET-1 and 0.05 wt. % of PBT elastomer.

With respect to the thus obtained bottle, the pressure resistant properties at high temperature defined herein were evaluated in the same manner as in Example 1. The results are given in Tables 1 and 2.

COMPARATIVE EXAMPLE 1

A further bottle was produced in the same manner as in Example 1 except. that the neck part was not crystallized and that the temperature of the blowing mold was changed to 30° C. (heat setting was not conducted).

With respect to the thus obtained bottle, the pressure resistant properties at high temperature defined herein were evaluated in the same manner as in Example 1. The results are given in Tables 1 and 2.

COMPARATIVE EXAMPLE 2

Still a further bottle was produced in the same manner as in Example 1 except that the temperature of the blowing mold was changed to 30° C. (heat setting was not conducted).

With respect to the thus obtained bottle, the pressure resistant properties at high temperature defined herein were evaluated in the same manner as in Example 1. The results are given in Tables 1 and 2.

COMPARATIVE EXAMPLE 3

Still a further bottle was produced in the same manner as in Example 1 except that only PET-1 was used.

With respect to the thus obtained bottle, the pressure resistant properties at high temperature defined herein were evaluated in the same manner as in Example 1. The results are given in Tables 1 and 2.

COMPARATIVE EXAMPLE 4

Still a further bottle was produced in the same manner as in Example 1 except that only PET-2 was used.

With respect to the thus obtained bottle, the pressure resistant properties at high temperature defined herein were evaluated in the same manner as in Example 1. The results are given in Tables 1 and 2.

COMPARATIVE EXAMPLE 5

Still a further bottle was produced in the same manner as in Example 1 except that use was made of a composition consisting of 95 wt. % of PET-1 and 5 wt. % of PBT elastomer.

With respect to the thus obtained bottle, the pressure resistant properties at high temperature defined herein were evaluated in the same manner as in Example 1. The results are given in Tables 1 and 2.

TABLE 1

| | Polyester composition | | | | |
|---|---|---|---|---|---|
| | Polyester | Polyester | Half time of crystal- | Heat crystal- lization | Heat set of |
| | Type | Amount wt. % | elastomer wt % | lizing (s) | of neck part | base part |
| Ex. 1 | PET-1 | 99.8 | 0.2 | 60 | applied | applied |
| Ex. 2 | PET-2 | 99.8 | 0.2 | 60 | applied | applied |
| Ex. 3 | PET 1 | 99.95 | 0.05 | 80 | applied | applied |
| Comp. Ex. 1 | PET-1 | 99.8 | 0.2 | 60 | none | none |
| Comp. Ex. 2 | PET-1 | 99.8 | 0.2 | 60 | applied | none |
| Comp. Ex. 3 | PET-1 | 100 | 0 | 200 | applied | applied |
| Comp. Ex. 4 | PET-2 | 100 | 0 | 200 | applied | applied |
| Comp. Ex. 5 | PET-1 | 95.0 | 5.0 | 30 | applied | applied |

TABLE 2

| | Hot bath test | | | Crystallinity | | | | |
|---|---|---|---|---|---|---|---|---|
| | wall part height change | diam. change | overt'g angle | neck part | wall part | base part | | |
| | % | % | ° | % | % | %*2 | %*3 | %*4 |
| Ex. 1 | 2 | 2 | 11 | 40 | 33 | 32 | 33 | 32 |
| Ex. 2 | 2 | 2 | 11 | 40 | 34 | 32 | 34 | 32 |
| Ex. 3 | 3 | 2 | 11 | 40 | 30 | 32 | 30 | 32 |
| Comp Ex. 1 | 15 | 8 | *1 | not more then 5 | 22 | 0 | 0 | 0 |
| Comp Ex. 2 | 15 | 8 | *1 | 40 | 22 | 0 | 0 | 0 |
| Comp Ex. 3 | 10 | 5 | *1 | 40 | 23 | 5 | 5 | 5 |
| Comp Ex. 4 | 12 | 6 | *1 | 40 | 22 | 5 | 5 | 5 |
| Comp Ex. 5 | 2 | 2 | 11 | 40 | 40 | 40 | 40 | 35 |

| | Heat crystallinity of base part %*3 | Orientation crystallinity of base part %*3 | Haze of wall part % |
|---|---|---|---|
| Ex. 1 | 16 | 17 | 3 |
| Ex. 2 | 16 | 17 | 4 |
| Ex. 3 | 16 | 14 | 3 |
| Comp Ex. 1 | — | — | 3 |
| Comp Ex. 2 | — | — | 3 |
| Comp Ex. 3 | 5 | 0 | 3 |
| Comp Ex. 4 | 5 | 0 | 4 |
| Comp Ex. 5 | 25 | 15 | 20 |

*1: overturning angle less than 10°
*2: zone of bottom part center to 7/10 R
*3: zone of 7/10 R to 9/10 R
*4: zone of 9/10 R to 10/10 R
(R: distance between base part center and perimeter)

What is claimed is:

1. A bottle molded from a polyester composition comprising 97 to 99.99% by weight of a polyester and 3 to 0.01% by weight of a polyester elastomer, the bottle being capable of containing a carbonated beverage and the bottle being a self-standing one piece bottle, wherein the bottle has a height direction and a transverse direction and meets one or both of the following criteria after a hot bath test in which the bottle is filled with a beverage containing 2.5 gas volume carbon dioxide at 23° C., stoppered and immersed in a sealed condition in a hot bath heated at 70° C. for 1 hr:

Criterion 1 the bottle filled with the carbonated beverage exhibits dimensional change ratios of not greater than 5% measured in the height direction of the bottle and also not greater than 5% measured in the transverse direction of the bottle, and Criterion 2 the bottle has an overturning angle of at least 10°, and wherein a neck part of the bottle is subjected to heat crystallization, and a base part of the bottle is heat set.

2. A bottle molded from a polyester composition comprising 97 to 99.99% by weight of a polyester and 3 to 0.01% by weight of a polyester elastomer, which bottle has a height direction and a wall part diameter direction and meets the following criteria after a hot bath test in which the bottle is filled with a beverage containing 2.5 gas volume carbon dioxide at 23° C., stoppered and immersed in sealed condition in a hot bath heated at 70° C. for 1 hr:

Criterion 1 the bottle filled with carbonated beverage exhibits dimensional change ratios of not greater than 5% as measured in the height direction of the bottle and also not greater than 5% as measured in the wall part diameter direction of the bottle, and Criterion 2 the bottle has an overturning angle of at least 10°; and wherein a neck part of the bottle is subjected to heat crystallization, and a base part of the bottle is heat set.

3. The bottle as claimed in any of claims 2, which exhibits a haze value of not greater than 5% at a wall center part of the bottle.

4. The bottle as claimed in claim 2, which is a self-standing bottle wherein a foot part is formed by the base part of the bottle.

* * * * *